(12) United States Patent
Baumann

(10) Patent No.: US 7,520,469 B2
(45) Date of Patent: Apr. 21, 2009

(54) PASSENGER SEAT, AN AIRCRAFT PASSENGER SEAT IN PARTICULAR

(75) Inventor: Jürgen Baumann, Ludwigshafen (DE)

(73) Assignee: Recaro Aircraft Seating GmbH & Co. KG, Schwabisch Hall (DE)

( * ) Notice: Subject to any disclaimer, the term of this patent is extended or adjusted under 35 U.S.C. 154(b) by 215 days.

(21) Appl. No.: 11/200,230

(22) Filed: Aug. 10, 2005

(65) Prior Publication Data
US 2006/0192052 A1 Aug. 31, 2006

(30) Foreign Application Priority Data
Feb. 26, 2005 (DE) .................. 10 2005 008 895

(51) Int. Cl.
*B64D 11/06* (2006.01)
(52) U.S. Cl. .................... 244/122 R; 297/313; 297/314
(58) Field of Classification Search ............. 244/118.5, 244/122 R; 297/314, 312, 313, 325, 326, 297/627, 353, 354, 338, 339
See application file for complete search history.

(56) References Cited

U.S. PATENT DOCUMENTS

| 7,223 | A | * | 3/1850 | White | 297/327 |
| 635,234 | A | * | 10/1899 | Chance | 297/327 |
| 2,266,528 | A | * | 12/1941 | Wininger | 248/596 |
| 2,284,352 | A | * | 5/1942 | Zank | 248/565 |
| 4,589,697 | A | * | 5/1986 | Bauer et al. | 297/301.2 |
| 5,452,868 | A | * | 9/1995 | Kanigowski | 244/122 R |
| 5,901,612 | A | * | 5/1999 | Letovsky | 74/471 XY |
| 5,927,797 | A | * | 7/1999 | Ferguson | 297/4 |
| 6,206,335 | B1 | * | 3/2001 | Huber et al. | 248/601 |
| 6,773,066 | B2 | * | 8/2004 | Caldwell | 297/302.1 |
| 7,100,983 | B1 | * | 9/2006 | Gant | 297/314 |

* cited by examiner

*Primary Examiner*—Tien Dinh
(74) *Attorney, Agent, or Firm*—Posz Law Group, PLC

(57) ABSTRACT

In a passenger seat, an aircraft passenger seat in particular, one seat component, such as seat carrier (9), seat element, backrest (3), and arm rest, can be placed at selected positions relative to other seat components and locked in these positions by a controllable fastening mechanism. The seat bottom (7) of the seat element is mounted to be pivotable about at least one pivot axis (15, 19) in relation to the seat carrier (9).

11 Claims, 4 Drawing Sheets

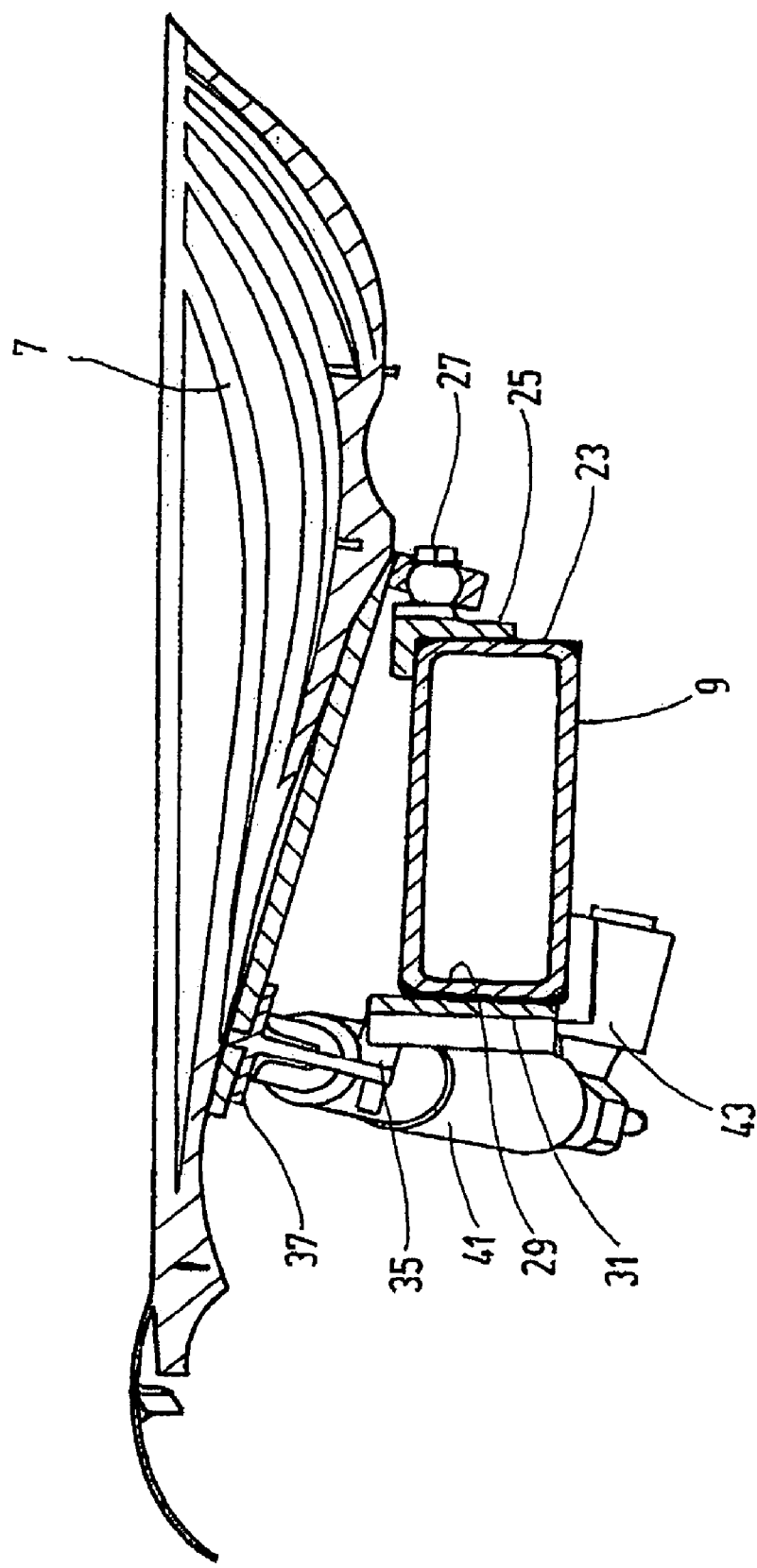

PASSENGER SEAT, AN AIRCRAFT PASSENGER SEAT IN PARTICULAR

FIELD OF INVENTION

The present invention relates to a passenger seat, an aircraft passenger seat in particular, with seat components such as seat carrier, seat element, backrest, and arm rest. At least one seat component can be placed in selectable positions relative to other seat components and locked in these positions by a controllable fastening mechanism.

BACKGROUND OF THE INVENTION

Known passenger seats of this kind are widely used in vehicles for passenger transportation such as buses, ferries, and especially aircraft in commercial aviation. Since use of such seats may entail extended travel periods, as is the case with long-distance flights, the possibility of adjusting the position of seat components represents an essential aspect of improving the comfort afforded a seat occupant. The seat occupant is thereby enabled to move the respective seat components from a standard or safety position, such as prescribed in aircraft for phases of operation represented by taxiing, takeoff, and landing, into adjusted positions desired by the passenger meeting passenger needs by offering the highest possible comfort, for example, by a making a rest or sleeping position available.

SUMMARY OF THE INVENTION

An object of the present invention is to provide a passenger seat offering the seat occupant adjustment options making an especially great contribution in seating comfort.

This object is attained according to the present invention by a passenger seat where the bottom of the seat element is mounted so that its position may be varied. The tilt of the seat component, as especially important for seating comfort, may be adjusted to achieve optimal satisfaction of the needs of the seat occupant. Adjustment of the tilt of the bottom of the seat about a pivot axis extending transversely to the longitudinal direction of the seat can increase comfort greatly, for example, in a back-tilted resting or sleeping position, with a leg rest possibly present in a raised position and the backrest tilted backward.

In advantageous exemplary embodiments, the seat bottom is mounted so as to be pivotable relative to the seat carrier about pivot axes forming an angle relative to each other. The pivot axes preferably extending perpendicularly relative to each other.

In such exemplary embodiments, the seat bottom may be connected to the seat carrier by a hinge configuration. The hinge configuration may be in the form of a universal joint, so that the seat bottom may be pivoted about two pivot axes mutually perpendicular to each other. The seat bottom can then be tilted forward and backward and to the left and the right, and for one of these tilted positions to overlap the other.

A hydraulic locking piston/cylinder element may be introduced as controllable fastening mechanism by means of which the seat occupant can lock the seat bottom in a selected adjusted position or tilted position, or a plurality of such elements may be introduced between seat carrier and seat bottom.

In place of a universal joint, the joint configuration may, in an alternative design, have two moving joints between seat bottom and seat carrier. The joints are displaced relative to each other in the longitudinal direction of the seat for locking a pivot axis extending in the longitudinal direction of the seat. For formation of another pivot axis extending in the traverse direction of the seat, one of the moving joints is configured as a ball-and-socket joint. The other is configured as a tenon-and-slot joint enabling pivoting and horizontal displacement.

In one advantageous exemplary embodiment the moving joint between rear areas of seat carrier and seat bottom is configured as a ball-and-socket joint and the tenon-and-slot joint is in contrast positioned on a joint carrier farther to the front. This joint carrier may have arms which extend on both sides of the pivot axis extending in the longitudinal direction of the seat, transversely to this direction along the seat bottom, while use may be made between seat carrier and the ends of the arms of the joint carrier of hydraulic locking elements of the fastening mechanism which permit both displacement and pivoting movement into adjusted positions and locking in these adjusted positions. In this configuration the hydraulic locking elements not only perform a locking function with respect to the pivoting movement about the pivot axis extending in the longitudinal direction of the seat, but also perform a dual function as the support elements for the front area of the seat bottom, the length of the support elements defining the tilt of the seat bottom about the pivot axis extending in the transverse direction of the seat.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 4 is a side elevational view in section along line IV-IV of FIG. 3.

DETAILED DESCRIPTION OF THE INVENTION

Figure 1:
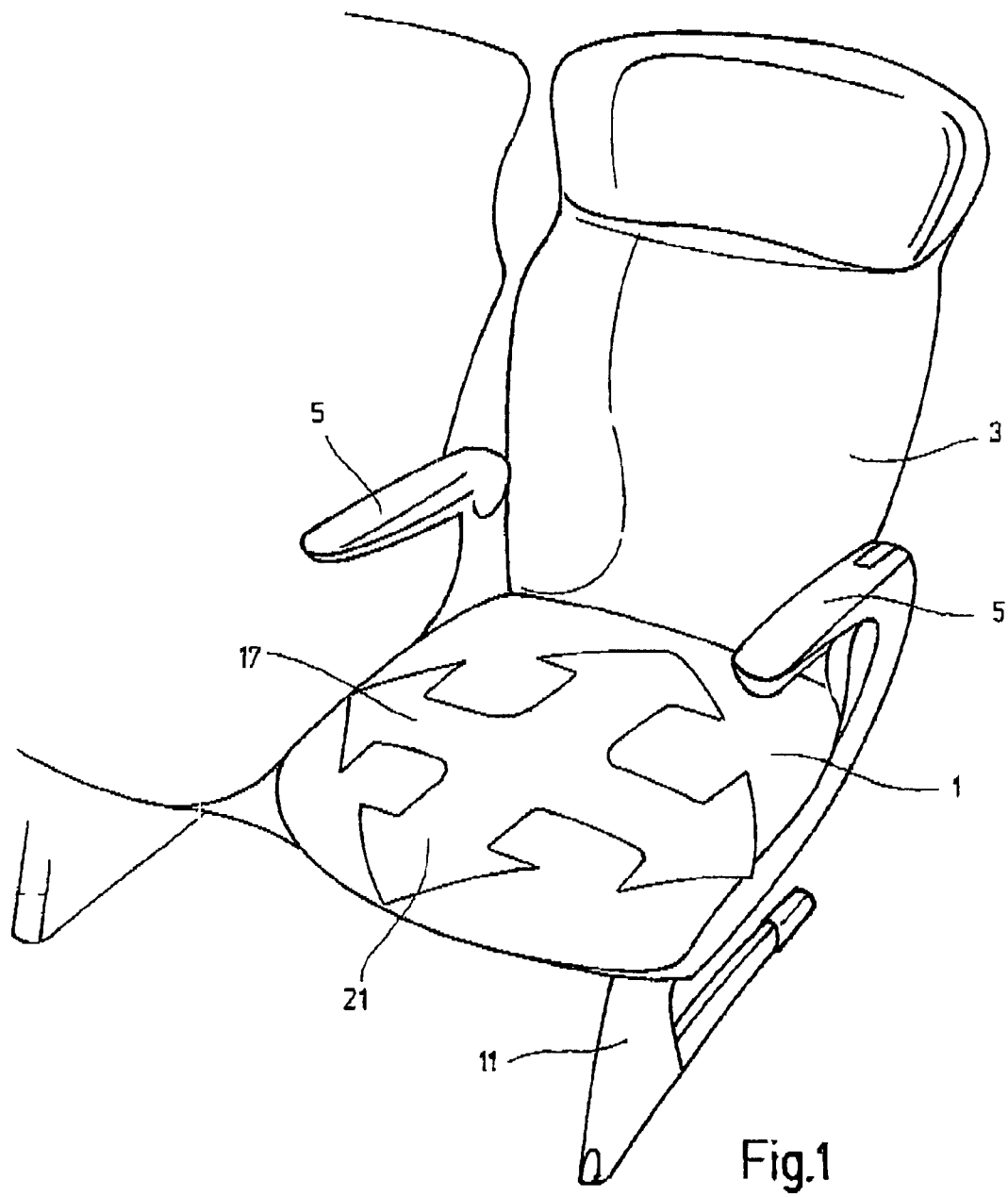
FIG. 1 is a simplified, diagrammatic, perspective view of a passenger seat according to an embodiment of the present invention in the form of an aircraft passenger seat.
Figure 2:
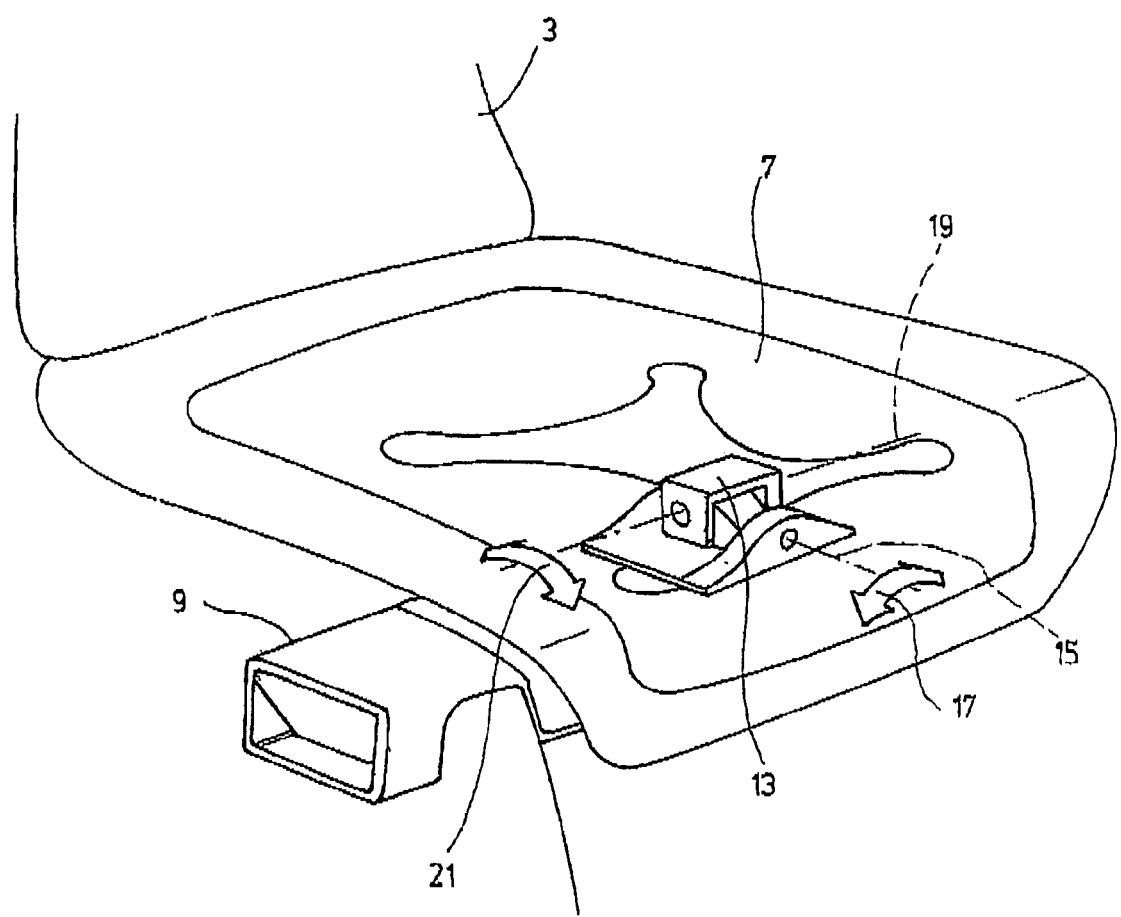
FIG. 2 is a simplified perspective partial view, in the form of a transparent sketch illustrating the gimbal bearings of the seat bottom of the exemplary embodiment shown in FIG. 1.

FIG. 1 presents a diagram of an aircraft passenger seat with a seat component 1, backrest 3, and side arm rests 5. The seat bottom 7 in the form of a seat shell (not visible in FIG. 1) performs the function of carrier element for the seat component 1, as shown in FIG. 2. The seat bottom 7 is mounted on a seat carrier 9 extending in the transverse direction of the seat, and is mounted above the respective cabin floor by a pedestal 11.

As is shown in the diagram in FIG. 2, the seat bottom 7 is mounted on the seat carrier 9 on gimbals by way of a universal joint 13 so that the seat bottom 7 may be tilted to both sides about a pivot axis 15 extending in the longitudinal direction of the seat, as indicated by the double arrow 17, and to the front and back about a pivot axis 19 extending in the transverse direction of the seat and perpendicular to the axis 15, as indicated by the double arrow 21. In the present example the pivoting range may be plus or minus 10° in relation to the normal position. A fastening mechanism which, for example, may have a hydraulic locking element unlockable optionally by the seat occupant introduced between seat bottom 7 and seat carrier 9 or between seat bottom 7 and another structural element of the seat, is for the sake of greater simplicity not illustrated in FIGS. 1 and 2. The designation "hydraulic element" relates to commercially available hydromechanical locking cylinders which may be unlocked by actuation of a valve.

Figure 3:
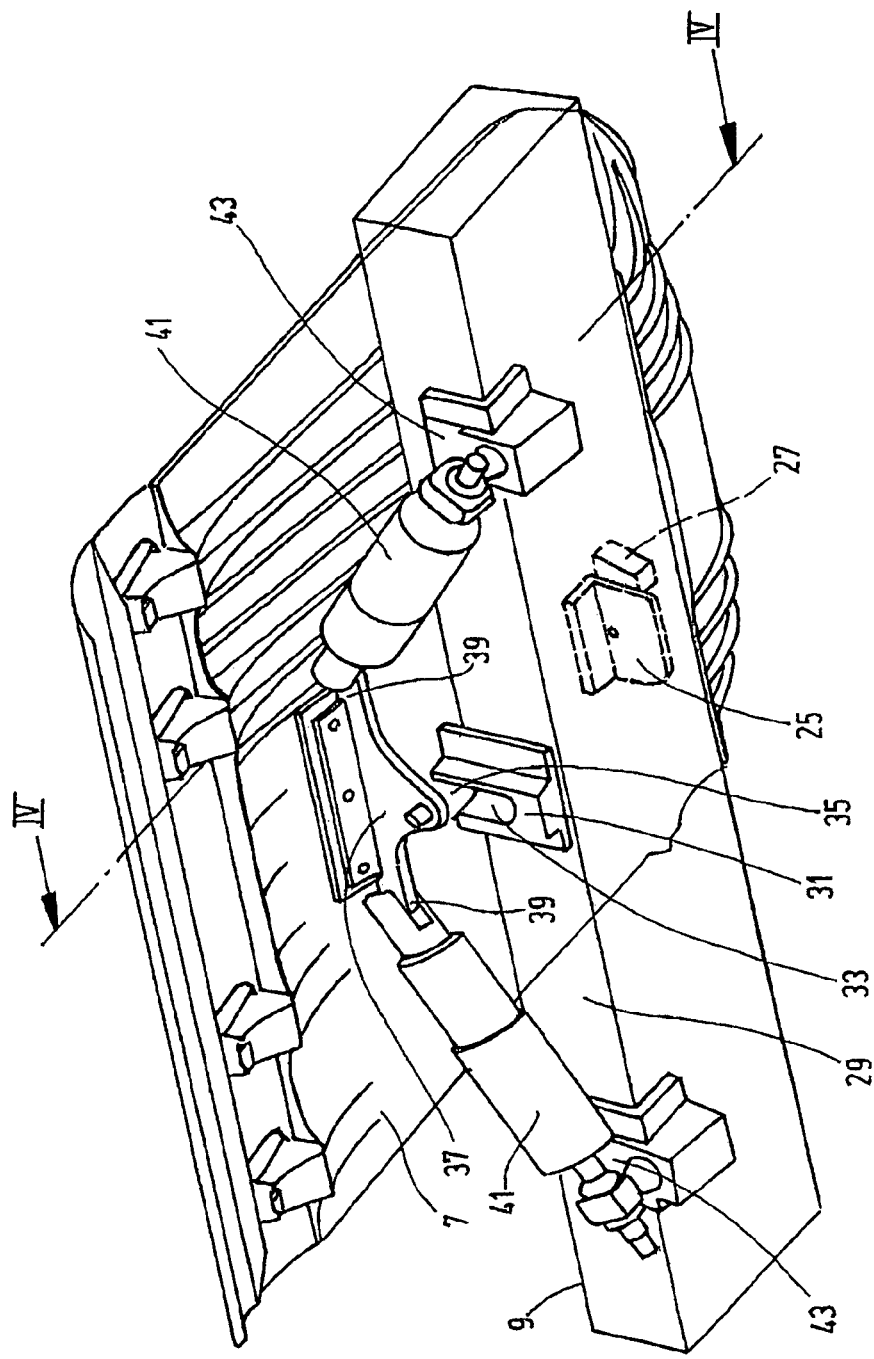
FIG. 3 is a perspective bottom view of the seat bottom and seat carrier area of a passenger seat according to a second embodiment of the present invention.

FIGS. 3 and 4 show a modified example in which a hinge configuration of a different design is provided between seat carrier 9 and seat bottom 7, in place of the universal joint 13 of the first embodiment. As in the first exemplary embodiment, the seat carrier 9 is represented by a box-type carrier extending in the direction transverse to the seat. On the rear end 23 of seat carrier 9, an elbow 25 is fastened, and functions as bearing block for a ball-and-socket moving joint 27 positioned in the rear area of the underside of the seat bottom 7. Preferably, the ball-and-socket moving joint 27 is configured as a rubber mounting or a mounting with a different type of elastomer bearing packing. In each case, the ball-and-socket moving joint 27 permits tilting of the seat bottom 7 both about the pivot axis 15 extending in the longitudinal direction of the seat and about the pivot axis 19 extending in the transverse direction of the seat. The moving joint 27 defining the pivot axis extending in the transverse direction of the seat.

A displacement guide 31 having a guide slot 33 open on the top is fastened on the front end 29 of the seat carrier 9, in alignment with the moving joint 27 in the longitudinal direction of the seat. In this guide slot 33 is a guide pin 35 which may be moved during pivoting movement of the seat bottom 7 about the pivot axis defined extending in the transverse direction of the seat, which pivot axis is defined by the moving joint 27. This pin 35 guided in the guide slot 33 is mounted on a joint support 37 which is connected in the front area of the seat bottom 7 to the underside of the latter. The joint support 37 has two arms 39 projecting from both sides of the guide pin 35 in the transverse direction of the seat. Each of the arms 39 is hinge-connected on its end to the piston rod of a hydraulic locking element 41 which is mounted by its opposite, cylinder end on an associated bearing block 43. Such bearing blocks 43 are positioned on the front end 29 of the seat carrier 9, displaced outward toward both sides opposite the displacement guide 31, to a position more or less below the associated side edge of the seat bottom 7.

The hydraulic locking elements 41 controllable by the seat occupant form between seat bottom 7 and seat carrier 9 support elements extending diagonally, the effective length of which determines the tilt of the seat bottom 7 about the pivot axis 19 defined by the moving joint 27 and extending in the transverse direction of the seat, the seat bottom 7 tilting to the rear when the hydraulic locking elements 41 are extended to their full length or the seat bottom 7 tilting forward when the length of extension of the elements 41 is reduced. If the hydraulic locking elements 41 are not extended to equal lengths, there results a corresponding tilting of the seat bottom 7 about the pivot axis 15 extending in the longitudinal direction of the seat and defined by the pin 35 in the guide 33. When the hydraulic locking elements 41 are in the locked position, the seat bottom 7 is locked in the adjusted position selected.

The side tilting of the seat bottom 7, when the hydrolock elements 41 are not extended to equal lengths, permits, along with appropriately selected tilting of the seat bottom 7 forward or backward, an especially comfortable seating position of the seat occupant sleeping on his/her side, providing optimal support being provided for the pelvis and hip. Tilting of the seat bottom 7 forward provides especially great seating comfort when the seat occupant is in a relatively stretched rest position.

While various embodiments have been chosen to illustrate the invention, it will be understood by those skilled in the art that various changes and modifications can be made therein without departing from the scope of the invention as defined in the appended claims.

What is claimed is:

1. A passenger seat, comprising:
   a seat carrier, which is adapted to be mounted on a cabin floor;
   a seat component with a seat bottom connected to said seat carrier by a joint assembly such that said seat bottom is pivotable about a first pivot axis relative to said seat carrier for movement between selected positions thereof; and
   an occupant fastening mechanism coupled to said seat bottom to lock said seat bottom in the selected positions and to release said seat bottom for movement between the selected positions, said fastening mechanism including at least two hydraulic locking elements wherein
   said seat bottom is pivotable about a second pivot axis relative to said seat carrier, and said first axis is perpendicular relative to said second pivot axis;
   said first pivot axis extends in a longitudinal direction of the seat; and said second pivot axis extends in a transverse direction of the seat;
   said seat carrier comprises a main extension direction that is horizontal and in said transverse direction;
   said hydraulic locking elements extend between said seat bottom and said seat carrier, and lengths of said hydraulic locking elements determine tilting of said seat bottom about said second pivot axis and unequal relative lengths of said hydraulic locking elements determine tilting of said seat bottom about said first pivot axis; and
   said hydraulic locking elements are mounted on a front end of said seat carrier, extend parallel to said front end, and are inclined with respect to each other.

2. A passenger seat according to claim 1 wherein said seat carrier has a longitudinal axis parallel to said second pivot axis and horizontal relative to said cabin floor.

3. A passenger seat, comprising:
   a seat carrier;
   a seat component with a seat bottom connected to said seat carrier by a joint assembly such that said seat bottom is pivotable about a first pivot axis relative to said seat carrier for movement between selected positions thereof; and
   an occupant fastening mechanism coupled to said seat bottom to lock said seat bottom in the selected positions and to release said seat bottom for movement between the selected positions, said fastening mechanism including at least one hydraulic locking element, wherein
   said seat bottom is pivotable about a second pivot axis relative to said seat carrier, said first and second pivot axes forming an angle therebetween
   said first axis is perpendicular relative to said second pivot axis
   said first pivot axis extends in a longitudinal direction of the seat;
   said second pivot axis extends in a transverse direction of the seat
   said joint assembly comprises first and second joints between said seat bottom and said seat carrier, wherein the joints are separated from one another along said first pivot axis in a longitudinal direction of the seat, one said first movable joint including a ball-and-socket joint to form said second pivot axis, and
said second movable joint including a tenon-and-slot joint providing pivoting and horizontal displacement.

4. A passenger seat according to claim 3 wherein
said first movable joint is mounted between rearward areas of said seat carrier and of said seat bottom; and
said second movable joint is mounted on a joint support on said seat bottom located forwardly of said first movable joint.

5. A passenger seat according to claim 4 wherein
said joint support comprises arms extending from both sides of said first pivot axis along said seat bottom; and
said fastening mechanism comprises two hydraulic locking elements between said seat carrier and ends of said arms enabling displacement movement and pivoting movement between the selected positions and locking in the selected positions on the second movable joint.

6. A passenger seat according to claim 1 wherein said joint assembly comprises a universal joint.

7. A passenger seat, comprising:
a seat carrier;
a seat component with a seat bottom connected to said seat carrier by a joint assembly such that said seat bottom is pivotable about a first pivot axis relative to said seat carrier for movement between selected positions thereof; and
an occupant fastening mechanism coupled to said seat bottom to lock said seat bottom in the selected position and to release said seat bottom for movement between the selected positions, said fastening mechanism including at least one hydraulic locking element, wherein
said seat bottom is pivotable about a second pivot axis relative to said seat carrier, said first and second pivot axes forming an angle therebetween
said first axis is perpendicular relative to said second pivot axis
said first pivot axis extends in a longitudinal direction of the seat;
said second pivot axis extends in a transverse direction of the seat
said seat carrier comprises a main extension direction that is horizontal and in said transverse direction;
a displacement guide having a guide slot open on a top thereof is fastened on said seat carrier; and
a guide pin is movably received in said guide slot during pivoting movement of said seat bottom about said second pivot axis.

8. A passenger seat according to claim 7 wherein said guide pin is coupled to a joint support connected on a front area of an underside of said seat bottom.

9. A passenger seat according to claim 8 wherein
said fastening mechanism comprises at least two hydro lock elements; and
said joint support comprises two arms with ends pivotally and respectively connected to each of said hydro lock elements.

10. A passenger seat according to claim 1 wherein the seat is an aircraft passenger seat.

11. A passenger seat according to claim 1 wherein a backrest and an armrest are coupled to said seat component.

* * * * *